United States Patent
Patel et al.

(10) Patent No.: US 11,286,780 B2
(45) Date of Patent: Mar. 29, 2022

(54) SEALING ASSEMBLY FOR REDUCING THRUST AND TURBOMACHINE INCLUDING THE SAME

(71) Applicant: HANWHA POWERSYSTEMS CO., LTD, Changwon-si (KR)

(72) Inventors: Bhavesh Patel, Changwon-si (KR); Robert Pelton, Changwon-si (KR)

(73) Assignee: HANWHA POWERSYSTEMS CO., LTD, Changwon-si (KR)

( * ) Notice: Subject to any disclaimer, the term of this patent is extended or adjusted under 35 U.S.C. 154(b) by 4 days.

(21) Appl. No.: 16/796,441

(22) Filed: Feb. 20, 2020

(65) Prior Publication Data

US 2021/0262346 A1 Aug. 26, 2021

(51) Int. Cl.
*F01D 5/02* (2006.01)
*F16J 15/02* (2006.01)

(52) U.S. Cl.
CPC .............. *F01D 5/026* (2013.01); *F16J 15/02* (2013.01); *F05D 2240/55* (2013.01)

(58) Field of Classification Search
CPC .. F05D 2240/55; F05D 2220/40; Y02T 10/14; B60Y 2400/435
See application file for complete search history.

(56) References Cited

U.S. PATENT DOCUMENTS

| | | | | |
|---|---|---|---|---|
| 4,213,307 A * | 7/1980 | Watson | ................. | F25B 31/004 |
| | | | | 62/192 |
| 4,664,605 A * | 5/1987 | Asano | ................... | F01D 25/183 |
| | | | | 417/407 |
| 5,176,497 A * | 1/1993 | Deacon | .................... | F01D 5/025 |
| | | | | 415/230 |
| 7,374,402 B2 * | 5/2008 | Thiele | ..................... | F01D 5/025 |
| | | | | 416/204 A |
| 7,722,336 B2 * | 5/2010 | Vaccarezza | ............. | F01D 5/025 |
| | | | | 417/407 |
| 8,348,595 B2 * | 1/2013 | Koch | ......................... | F02C 6/12 |
| | | | | 415/111 |
| 8,398,363 B2 * | 3/2013 | Mundinger | ............... | F02C 7/06 |
| | | | | 415/111 |
| 9,328,628 B2 * | 5/2016 | Schenkenberger | ... | F04D 29/056 |
| 10,408,221 B2 * | 9/2019 | Byon | ...................... | F01D 5/048 |
| 10,648,511 B2 * | 5/2020 | Iizuka | ..................... | F02B 39/00 |
| 2005/0042105 A1 * | 2/2005 | Nishiyama | ............ | F04D 29/266 |
| | | | | 416/183 |
| 2015/0198043 A1 * | 7/2015 | Striedelmeyer | ......... | F04D 29/20 |
| | | | | 416/213 R |

FOREIGN PATENT DOCUMENTS

KR 10-0748892 B1 8/2007

* cited by examiner

*Primary Examiner* — Jesse S Bogue
(74) *Attorney, Agent, or Firm* — Sughrue Mion, PLLC

(57) ABSTRACT

A sealing assembly, which is mounted at a rear end of an impeller, and a turbo machine including the sealing assembly is provided, the sealing assembly includes a rotation body having a ring shape that surrounds a shaft coupled with the impeller at the rear end of the impeller; and an extension portion extending from the rotation body to the rear end of the impeller, such that an inner space is formed between the rotation body and the rear end of the impeller, wherein the extension portion is sealingly coupled with the rear end of the impeller.

18 Claims, 6 Drawing Sheets

SEALING ASSEMBLY FOR REDUCING THRUST AND TURBOMACHINE INCLUDING THE SAME

BACKGROUND

1. Field

The present disclosure relates to a sealing assembly used for a turbomachine such as a compressor, a pump, or a turbine, and more particularly to a sealing assembly for preventing fluid from being discharged from an impeller mounted in a turbomachine and reducing a thrust applied to the impeller, and a turbomachine including the sealing assembly.

2. Description of the Related Art

The impeller mounted in a rotation unit of a turbomachine is an apparatus for increasing the pressure of a fluid by transmitting rotary kinetic energy to the fluid while rotating at a high speed. In this case, the fluid at the front of the impeller flows at high speed and low pressure, while the fluid leaking at the back of the impeller flows at low speed and high pressure. Thus, due to a positive pressure difference between the front and back of the impeller, the impeller generates an axial thrust from the back of the impeller toward the front thereof.

When the thrust is generated, the durability of the impeller and a housing may be deteriorated, and the thrust may transmitted to a bearing coupled with a rotary shaft so as to cause the bearing to break, thereby interfering with stable operation of the turbomachine.

In related art, in order to prevent the deterioration of the overall performance of such a turbomachine, the back of the impeller is provided with a labyrinth seal to reduce the amount of a fluid flowing through a gap between the impeller and the housing, and an air passage is formed along the rotary shaft of the impeller and air flowing toward the back of the impeller is discharged toward the inlet at the front of the impeller, thereby reducing a thrust.

However, in related art, there is a problem that the loss of an operating fluid occurs which reduces the efficiency of the turbomachine.

SUMMARY

Embodiments of the present disclosure may address the above problem of the related art and other problems. For example, embodiments of the present disclosure provide a sealing assembly for reducing a thrust while minimizing the efficiency reduction of a turbomachine, and also provide a turbomachine including the sealing assembly.

An aspect of the present disclosure is to provide a sealing assembly for reducing a thrust applied to an impeller mounted in a turbomachine such as a compressor, and particularly to provide a sealing assembly in which a joint between an impeller and a shaft is sealed to form a low-pressure inner space at the back of the impeller, thereby preventing the reduction in efficiency of the turbomachine due to the leakage of an operating fluid while minimizing the thrust applied to the impeller and preventing a dry gas seal installed at the back of the impeller from moving in an axial direction.

According to an aspect of the present disclosure, there is provided a sealing assembly, which is mounted at a rear end of an impeller, the sealing assembly including: a rotation body having a ring shape to surround a shaft coupled with the impeller at the rear end of the impeller; and an extension portion extending from the rotation body to the rear end of the impeller to form an inner space between the rotation body and the rear end of the impeller, wherein the extension portion is sealingly coupled with the rear end of the impeller.

The extension portion may be sealingly coupled with the rear end of the impeller through a sealing member.

The extension portion may be fitted with the rear end of the impeller through the sealing member.

The sealing member may be an O-ring.

The extension portion may extend from the rotation body in an axial direction of the rotation body, or may extend from the rotation body in axial and radial directions of the rotation body.

The rotation body may integrally rotate together with the shaft.

The rotation body may have a thread formed on a surface of the rotation body, the surface being coupled with the shaft, and may be coupled with the shaft by a thread formed on the shaft to correspond to the thread formed on the rotation body.

The rotation body may be sealingly coupled with the shaft through an adhesive.

According to another aspect of the present disclosure, there is provided a turbomachine, including: an impeller rotating at a high speed to suck a fluid; a shaft coupled with the impeller at a rear end of the impeller to integrally rotate together with the impeller; and a sealing assembly provided at the rear end of the impeller to reduce a thrust applied to the impeller, wherein the sealing assembly includes: a rotation body having a ring shape to surround the shaft; and an extension portion extending from the rotation body to the rear end of the impeller to form an inner space between the rotation body and the rear end of the impeller, wherein the extension portion is sealingly coupled with the rear end of the impeller.

However, aspects of the present disclosure are not restricted to the aspects set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail non-limiting examples embodiments thereof with reference to the attached drawings, in which.

DETAILED DESCRIPTION

Figure 1:
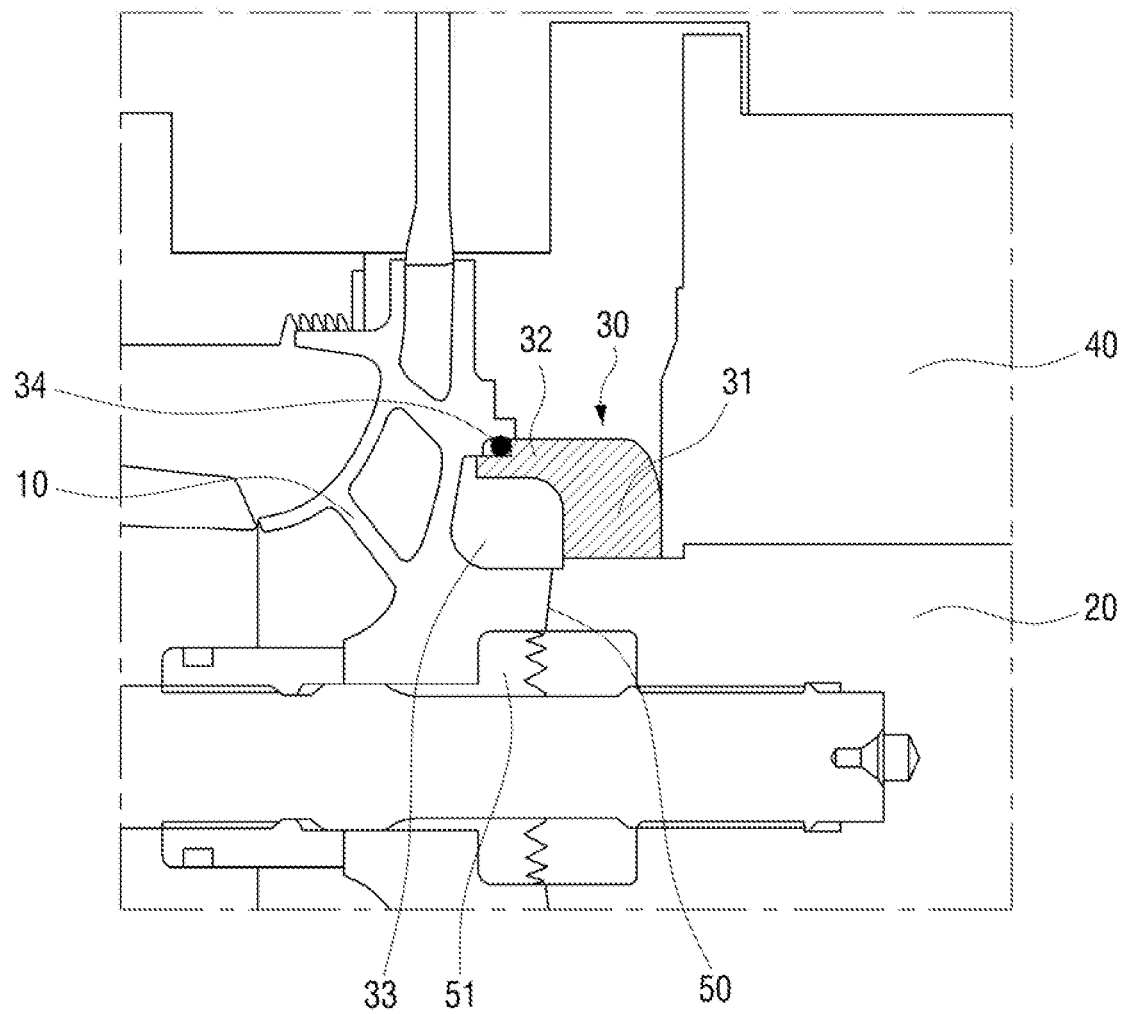
FIG. 1 is a side cross-sectional view showing the coupling relationship of an impeller, a shaft, and a sealing assembly according to an embodiment of the present disclosure.

Embodiments of the present disclosure will be described in detail in order to allow those skilled in the art to practice embodiments of the present disclosure. It should be appreciated that various embodiments of the present disclosure are different, but are not necessarily exclusive. For example, specific shapes, configurations, and characteristics described in an embodiment of the present disclosure may be implemented in another embodiment without departing from the spirit and the scope of the present disclosure. In addition, it should be understood that positions and arrangements of individual components in each disclosed embodiment may be changed without departing from the spirit and the scope of the present disclosure. Therefore, the detailed description provided below should not be construed as being restrictive. Like reference numerals refer to like elements throughout the specification.

Unless otherwise defined, all terms including technical and scientific terms used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The terms used herein is for the purpose of describing particular embodiments only and are not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, embodiments of the present disclosure will be described with reference to the accompanying drawings.

FIG. 1 is a side cross-sectional view showing the coupling relationship of an impeller, a shaft, and a sealing assembly according to an embodiment of the present disclosure.

A rotor, which is a rotation unit of a turbomachine, may include a bull gear (not shown) for transmitting a driving force generated by a power source, a pinion gear (not shown) engaged with the bull gear to transmit the received driving force to a shaft 20, the shaft 20 coupled with the pinion gear to integrally rotate together with the pinion gear, and an impeller 10 coupled with the shaft 20 to rotate at a high speed and suck an external fluid.

When the impeller 10 rotates at a high speed, a fluid is moved along a blade provided at the front of the impeller 10 by a centrifugal force. A diffuser reduces the speed of the fluid sucked by the impeller 10 and converts the reduced speed into pressure. The low-speed and high-pressure fluid passing through moves along a scroll and is discharged through a duct.

A part of the fluid sucked by the impeller 10 does not move along the scroll, and may be discharged to the back of the impeller 10 through a gap between the impeller 10 and a housing. Since the leaking fluid reduces the efficiency of the turbomachine, an air seal for preventing the leakage of the fluid may be provided at the back of the impeller 10.

The shaft 20 is coupled with the impeller 10 at the rear end of the impeller 10. A cavity 51 for coupling is formed at one end of the shaft 20 coupled with the impeller 10, and an extension member such as a tie bolt is provided in the cavity 51 to couple the shaft 20 with the impeller 10. A joint 50 may be provided at a surface where the shaft 20 and the impeller 10 contact each other to transmit a torque of the shaft 20 to the impeller 10 and to adjust shaft alignment. The joint 50 may be a hirth joint or a curvic joint, but is not limited thereto.

Since the joint 50 between the impeller 10 and the shaft 20 is not provided with sealing engagement, the external air at the front of the impeller 10 may be introduced into the back of the impeller 10 through a minute gap between the joints 50, or the high-pressure fluid discharged to the back of the impeller 10 may be introduced into the cavity 51.

Particularly, when the high-pressure fluid discharged to the back of the impeller 10 is introduced into the cavity 51, a stronger thrust is applied to the impeller 10. When the thrust is applied to the impeller 10 in this way, the impeller 10 may move forward to reduce the suction efficiency of the fluid, or the turbomachine may be damaged due to the friction between the impeller rotating at a high speed and the housing. Further, when the thrust is transmitted to a bearing coupled with the rotating shaft and the bearing is damaged, the stable running of the turbomachine may be difficult.

In order to minimize the problem of the thrust applied to the impeller 10, a sealing assembly 30 for thrust reduction may be mounted at the rear end of the impeller 10.

According to an embodiment of the present disclosure, the sealing assembly 30 includes a rotation body 31 having a ring shape at the rear end of the impeller 10 to surround the shaft 20 coupled with the impeller 10, and an extension portion 32 extending from the rotation body 31 toward the rear end of the impeller 10 to form an inner space 33 between the rotation body 31 and the rear end of the impeller 10. The extension portion 32 may be sealingly coupled with the rear end of the impeller 10.

The rotation body 31 may surround the circumference of the shaft 20 to 360°, may be coupled with the shaft 20, and may integrally rotate together with the shaft 20. The rotation body 31 has a ring shape. Here, the ring shape means a shape in which a fastener is formed at the center thereof such that the rotation body 31 is coupled with the shaft 20. The longitudinal section of the rotation body 31 may be formed in a circular shape, but the shape thereof is not limited thereto.

According to an embodiment of the present disclosure, the end of the impeller 10, opposite to the rotation body 31, may be formed to be flat, and may also be formed to be curved. When the end of the impeller 10 is formed to be flat, an inclined surface or a rounded surface may be formed at the corner thereof. The end of the rotation body 31 may be formed adjacent to a dry gas seal 40 to be described later to prevent the axial movement of the dry gas seal 40.

The extension portion 32 may extend from the rotation body 31 toward the rear end of the impeller 10 in an axial direction such that the inner space 33 is formed between the rotation body 31 and the rear end of the impeller 10. In order to form the inner space 33, the extension portion 32 may extend in an axial direction from a point spaced in a radial direction of the rotation body 31 from a point at which the rotation body 31 is coupled with the shaft 20 toward the rear end of the impeller 10, the shaft 20 to be coupled with the rear end of the impeller 10. One or more extension portions 32 may be formed, and may extend in the axial direction and radial direction of the rotation body 31.

According to an embodiment of the present disclosure, the extension portion 32 may be formed in various shapes to form the closed inner space 33 surrounded by the extension portion 32, the rear end of the impeller 10, and the rotation body 31. The shape of the extension portion 32 is not particularly limited. The extension portion 32 extends from a point spaced in the radial direction of the rotation body 31 from the shaft 20 on the end of the rotation body 31, facing the impeller 10, toward the rear end of the impeller 10 in the axial direction of the rotation body 31 to a length so that the extension portion 32 can be coupled to the impeller 10. The thickness of the extension portion 32 may be decreased or increased toward the impeller 10. The extension portion 32 may extend in parallel with the axial direction, but may obliquely extend such that the coupling angle between the extension portion 32 and the rear end of the impeller 10 may be acute, obtuse, as well as perpendicular. In addition, the extension portion 32 may be formed such that the axial cross section of the extension portion 32 forms a parabola. A radial extension part of the extension portion 32 of the rotation body 31 may be formed together with an axial extension part of the extension portion 32 of the rotation body 31.

According to an embodiment of the present disclosure, the extension portion 32 and the rear end of the impeller 10 may be sealingly coupled with each other to prevent the inflow and outflow of a fluid. A step may be formed at the end of the impeller 10 toward the impeller 10, and a step may also be formed at the rear end of the impeller 10 coupled with the extension portion 32 to correspond to the step of the extension portion 32 at the end of the impeller 10, thereby improving the matching of coupling. In addition, a sealing member 34 may be provided between the extension portion 32 and the rear end of the impeller 10 so as to provide sealability of coupling. As the sealing member 34, various kinds of mechanical seals may be used, and particularly, an O-ring may be used.

According to an embodiment of the present disclosure, the extension portion 32 and the rear end of the impeller 10 may be coupled by a fitting method. Specifically, an O-ring is mounted on the step formed at one end of the extension portion 32, and is coupled with the step formed at the rear end of the impeller 10 by a fitting method, so that the coupling portion between the extension portion 32 and the rear end of the impeller 10 may be sealed.

According to an embodiment of the present disclosure, the sealing assembly 30 is mounted on the turbomachine by the coupling between the extension portion 32 and the rear end of the impeller 10 and the coupling between the rotation body 31 and the shaft 20. The extension portion 32 may be coupled with the step formed at the rear end of the impeller 10 and having a shape corresponding to the cross-section of the extension portion 32, and the rotation body 31 may be coupled with the shaft 20 through a thread 35 and/or an adhesive.

The position at which the rotation body 31 is coupled on the shaft 20 is determined as a point sufficient for forming the closed inner space 33 surrounded by the rotation body 31, the extension portion 32, and the end of the impeller 10, and is not limited thereto. However, the joint 50 to which the impeller 10 and the shaft 20 are coupled may be located between the rear end of the impeller 10 and the rotation body 31. In this case, the low-pressure fluid introduced into the cavity 51 at the front of the impeller 10 may be introduced into the inner space 33 through the joint 50, so that the inner space 33 may be maintained at a low pressure.

According to an embodiment of the present disclosure, a dry gas seal 40 may be provided to seal the fluid leaking to the back of the impeller 10. In this case, the position at which the rotation body 31 is coupled on the shaft 20 is determined such that one end of the rotation body 31 may be adjacent to the dry gas seal 40. Accordingly, since one end of the rotation body 31 is in contact with the dry gas seal, there can be obtained additional effects of supporting the dry gas seal 40 in the axial direction by using a coupling force between the extension portion 32 and the rear end of the impeller 10 and a coupling force between the rotation body 31 and the shaft 20 and preventing the dry gas seal 40 from moving in the axial direction.

According to an embodiment of the present disclosure, the inflow and outflow of a fluid may be blocked between the inner space 33 surrounded by the rotation body 31, the extension portion 32 and the rear end of the impeller 10 and the outer space formed at the back of the impeller 10. Accordingly, the high-pressure fluid discharged to the back of the impeller 10 may not be introduced into the inner space 33 from the outside of the sealing assembly 30, and the pressure in the inner space 33, similarly to the pressure at the front of the impeller 10, may be maintained at low pressure, so that the thrust applied to the impeller 10 may be reduced.

Meanwhile, in order to prevent high-pressure fluid from being discharged to the back of the impeller 10 through a gap between the impeller 10 and the housing, at the back of the impeller 10, a labyrinth seal, a floating seal, a carbon seal, or the like may be used as an air seal. In particular, the dry gas seal 40 having a low fluid leak rate may be used as an air seal.

The dry gas seal 40 is a seal using dry gas instead of seal oil, and includes a fixed component and a rotary component. A gap is formed between the fixed component and the rotary component, and dry gas is provided in the gap to be maintained at higher pressure than an operating fluid, thereby preventing the leakage of the operating fluid.

In such an embodiment, since the dry gas seal 40 includes the rotary component, fixation may be particularly required. Conventionally, methods of fixing a dry gas seal to a shaft using a lock nut have been employed. However, according to an embodiment of the present disclosure, the axial movement of the dry gas seal 40 may be prevented by installing one end of the rotation body 31 to be adjacent to the one end of the dry gas seal 40. Thus, there is no need to secure additional space that is conventionally used for placement of a lock nut.

Figure 2:
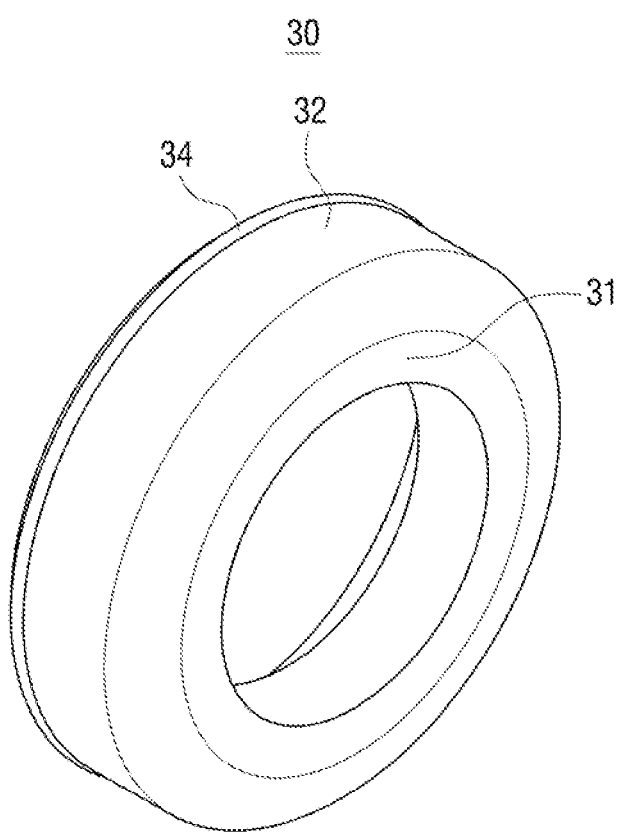
FIG. 2 is a perspective view of a sealing assembly according to an embodiment of the present disclosure.

FIG. 2 is a perspective view of a sealing assembly according to an embodiment of the present disclosure.

Figure 3:
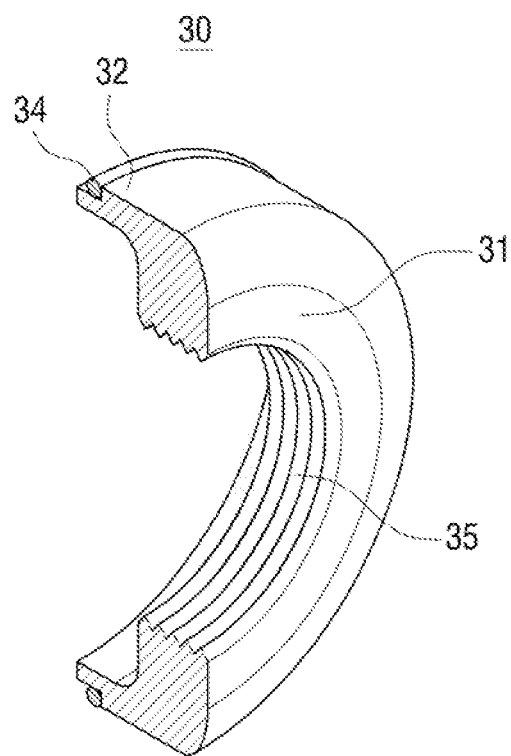
FIG. 3 is a perspective view of a cross-section of the sealing assembly taken in an axial direction according to an embodiment of the present disclosure.

FIG. 2 is a perspective view of a sealing assembly according to an embodiment of the present disclosure, and FIG. 3 is a perspective view of a cross-section of the sealing assembly taken in an axial direction according to an embodiment of the present disclosure.

Referring to FIG. 2, in the sealing assembly 30, the rotation body 31 may have a ring shape in which a fastener for coupling with the shaft 20 may be provided at the center thereof, the extension portion 32 may be formed from one end of the rotation body 31 toward the rear end of the impeller 10 in the axial direction of the rotation body 31, a step for coupling with the rear end of the impeller 10 may be formed at the end of the extension portion 32, and the step may be provided with an O-ring to seal a space between the extension portion 32 and the rear end of the impeller 10.

According to an embodiment of the present disclosure, the rotation body 31 and the shaft 20 may integrally rotate by coupling with each other. When the rotation body 31 and the shaft 20 integrally rotate, the leakage of a fluid through the coupling portion may be prevented because there is almost no relative movement between the rotation body 31 and the shaft 20.

Referring to FIG. 3, screw engagement may be used to rotate the rotation body 31 and the shaft 20 integrally. A thread 35 is formed on the inner circumferential surface of the rotation body 31 coupled to the shaft 20, and another thread 35 corresponding to the thread 35 of the rotation body 31 is formed on the outer circumferential surface of the shaft 20, so that thread engagement may be performed between the rotation body 31 and the shaft 20. Accordingly, when thread engagement is performed between the rotation body 31 and the shaft 20, it is possible to secure the easiness of installation and the robustness of coupling.

According to an embodiment of the present disclosure, the rotation body 31 and the shaft 20 may be coupled by using an adhesive such as Loctite. According to the method of using an adhesive, the air tightness of coupling can be improved.

Figure 4:
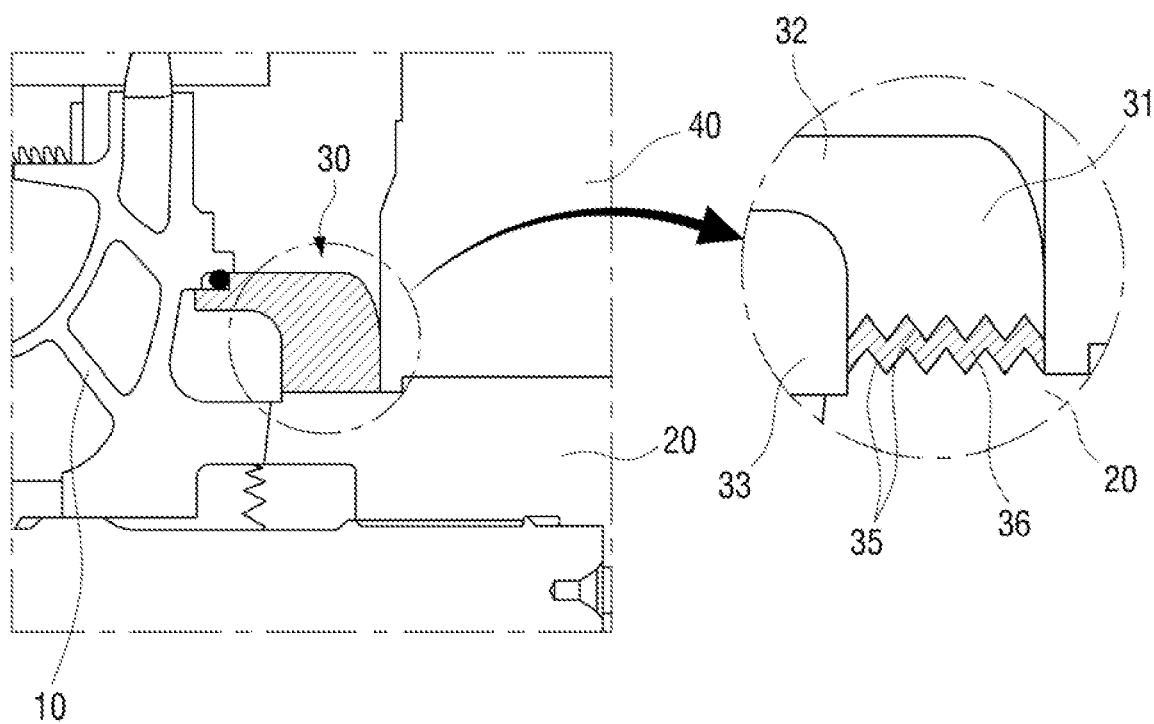
FIG. 4 is an enlarged side cross-sectional view showing the coupling of the sealing assembly and the shaft according to an embodiment of the present disclosure.

Referring to FIG. 4, the rotation body 31 and the shaft 20 are coupled by the threads 35 corresponding to each other, and simultaneously an adhesive is applied onto the corresponding region of the thread 35 formed on the coupling surface of the rotation body 31 and the shaft 20, so that the robustness and airtightness of the coupling between the rotation body 31 and the shaft 20 can be improved. In this case, it is possible to more effectively prevent the fluid in the inner space 33 from being discharged to the outside of the sealing assembly 30, and the dry gas seal located adjacent to the sealing assembly of the present disclosure can be more strongly fixed.

Hereinafter, a thrust reduction principle acting on the impeller 10 will be described on the basis of the coupling relationship between the components of the sealing assembly 30 and the components of the turbomachine.

Figure 5A:
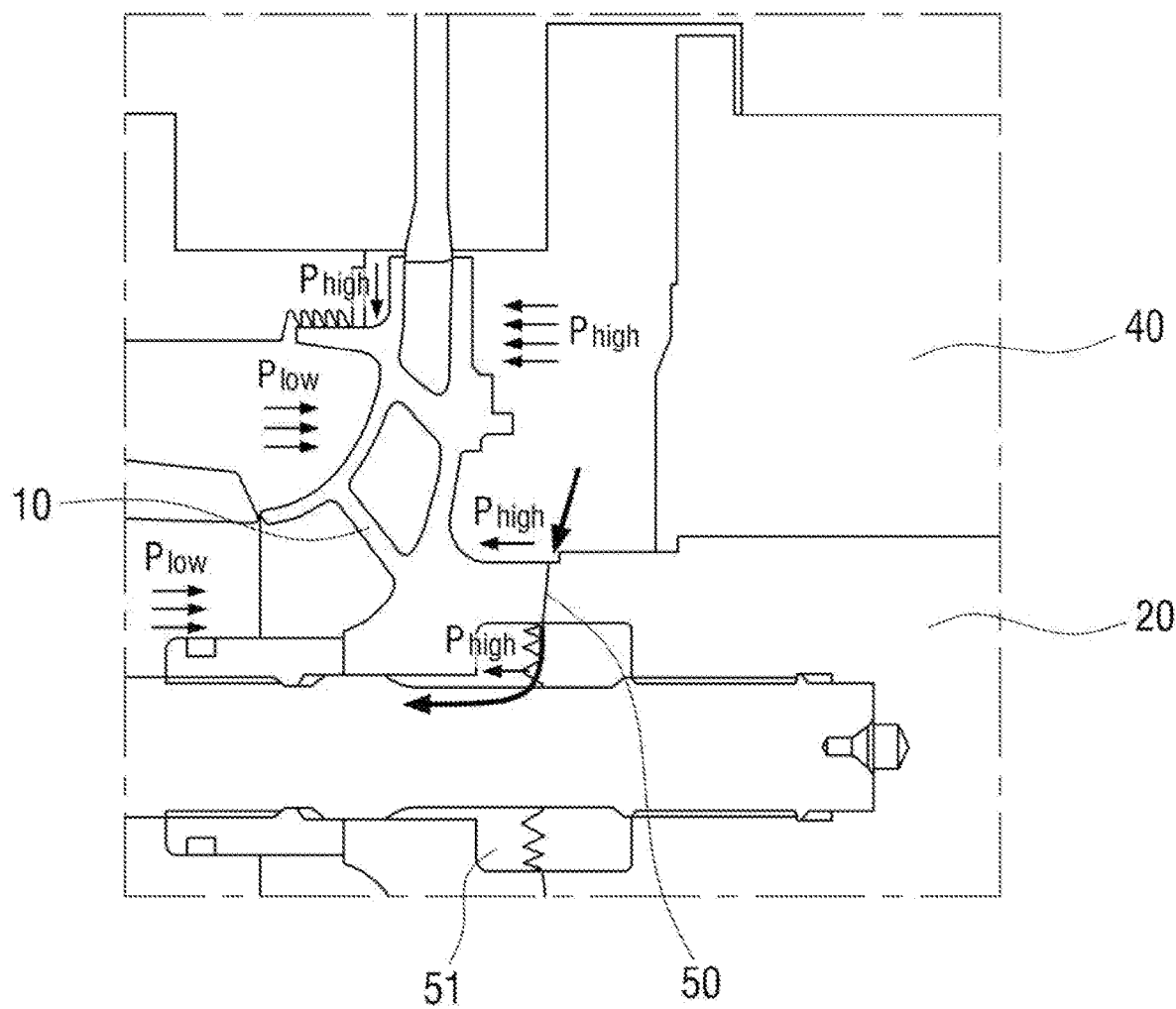
FIG. 5A is a side cross-sectional view showing the pressure distribution of the front and back of the impeller when the sealing assembly of the present disclosure is not provided.
Figure 5B:
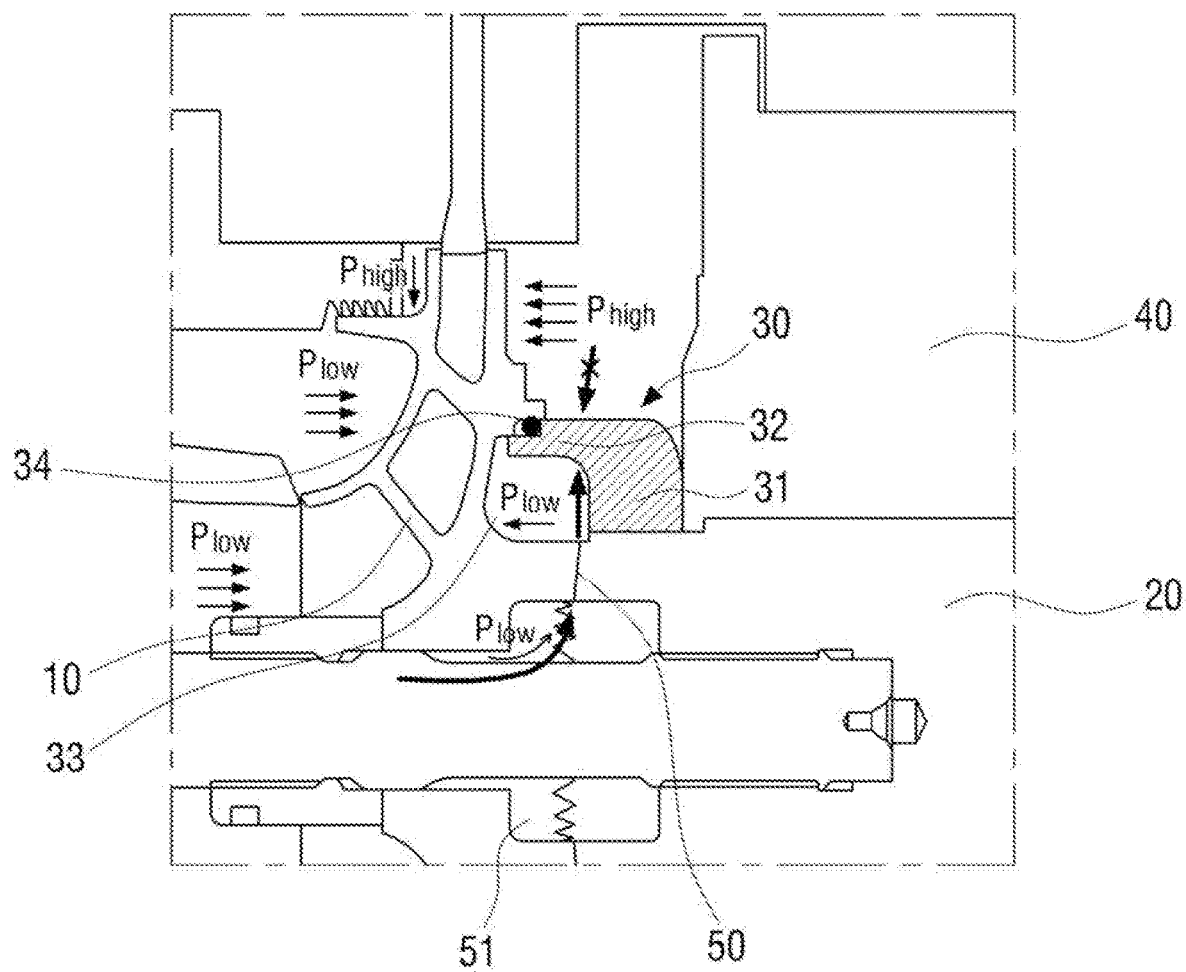
FIG. 5B is a side cross-sectional view showing the pressure distribution of the front and back of the impeller when the sealing assembly of the present disclosure is provided.

FIG. 5A is a side cross-sectional view showing the pressure distribution of the front and back of the impeller when the sealing assembly of the present disclosure is not provided, and FIG. 5B is a side cross-sectional view showing the pressure distribution of the front and back of the impeller when the sealing assembly of the present disclosure is provided.

Referring to FIG. 5A, a part of the fluid sucked by the impeller 10 and then compressed to high pressure is discharged to the back of the impeller 10 without moving along a scroll, and thus the pressure in the space sealed by the dry gas seal at the back of the impeller 10 is maintained at high pressure. When the sealing assembly 30 of the present disclosure is not provided, a fine spacing exists in the joint 50 between the shaft 20 and the impeller 10, and thus the high-pressure fluid at the back of the impeller 10 may be introduced into the cavity 51 through the joint 50. Accordingly, a thrust is generated in the impeller 10 toward the front of the impeller 10 from the rear of the impeller 10 in the axial direction by a static pressure difference between the high-pressure fluid distributed in the rear of the impeller 10 and the space in the cavity 51 and the low-pressure fluid distributed in the front of the impeller 10.

In contrast, referring to FIG. 5B, the high-pressure fluid discharged to the back of the impeller 10 may not introduced into the inner space 33 of the sealing assembly 30 of the present disclosure. The reason for this is that the coupling portion among the impeller 10, the sealing assembly 30 and the shaft 20, integrally rotating, is sealingly coupled, that is, sealing coupling is performed between the extension portion 32 and the rear of the impeller 10 and between the rotation body 31 and the shaft 20. Meanwhile, the low-pressure at the front of the impeller 10 may be introduced into the cavity 51, and may again be introduced into the inner space 33 through the joint 50 between the impeller 10 and the shaft 20. Accordingly, the pressure in the inner space 33 of the sealing assembly 30 and the pressure in the cavity 51 are maintained at low pressure. Comparing the case of FIG. 5B with the case of FIG. 5A, the static pressure difference between the front and back of the impeller 10 is reduced, so that the thrust applied to the impeller 10 may be reduced.

According to embodiments of the present disclosure, effects thereof are as follows.

A high-pressure fluid entering the back of an impeller can be prevented from flowing into a cavity formed in a shaft through a joint between the impeller and the shaft, and a low-pressure inner space can be formed at the back of the impeller, thereby reducing an axial thrust applied to the impeller. Therefore, it is possible to prevent the impeller from moving forward in an axial direction to ensure the stable running of the turbomachine. Moreover, it is possible to prevent a dry gas seal from moving in the axial direction.

Although non-limiting example embodiments of the present disclosure have been disclosed for illustrative purposes, those skilled in the art will appreciate that various modifications, additions and substitutions are possible, without departing from the scope and spirit of the disclosure as described in the specification and the accompanying claims.

What is claimed is:

1. A sealing assembly, which is mounted at a rear end of an impeller, the sealing assembly comprising:
    a rotation body having a ring shape that surrounds a shaft coupled with the impeller at the rear end of the impeller; and
    an extension portion extending from the rotation body to the rear end of the impeller, such that an inner space is formed between the rotation body and the rear end of the impeller,
    wherein the extension portion is sealingly coupled with the rear end of the impeller,
    wherein an axial end surface of the shaft is coupled with an axial end surface of the impeller, at the rear end of the impeller, such that a joint is formed between the axial end surface of the shaft and the axial end surface of the impeller, and
    wherein a radially outer end of the joint is exposed to the inner space that is formed between the rotation body and the rear end of the impeller.

2. The sealing assembly of claim 1, wherein the extension portion is sealingly coupled with the rear end of the impeller by a sealing member.

3. The sealing assembly of claim 2, wherein the extension portion is fitted with the rear end of the impeller by the sealing member.

4. The sealing assembly of claim 2, wherein the sealing member is an O-ring.

5. The sealing assembly of claim 1, wherein the extension portion extends from the rotation body in an axial direction of the rotation body.

6. The sealing assembly of claim 1, wherein the rotation body integrally rotates together with the shaft.

7. The sealing assembly of claim 1, wherein the rotation body has a thread formed on a surface of the rotation body, the surface being coupled with the shaft by a thread formed on the shaft that corresponds to the thread formed on the rotation body.

8. The sealing assembly of claim 1, wherein the rotation body is sealingly coupled with the shaft by an adhesive.

9. A turbomachine, comprising:
an impeller configured to rotate at a high speed to suck a fluid;
a shaft, the shaft including an axial end surface that is coupled with an axial end surface of the impeller at a rear end of the impeller such that a joint is formed between the axial end surface of the shaft and the axial end surface of the impeller, and the shaft is configured to integrally rotate together with the impeller; and
a sealing assembly provided at the rear end of the impeller to reduce a thrust applied to the impeller,
wherein the sealing assembly includes:
a rotation body having a ring shape that surrounds the shaft; and
an extension portion extending from the rotation body to the rear end of the impeller such that an inner space is formed between the rotation body and the rear end of the impeller,
wherein the extension portion is sealingly coupled with the rear end of the impeller,
wherein a cavity is formed between an end of the shaft and the rear end of the impeller, and
wherein a radially outer end of the joint is exposed to the inner space, that is formed between the rotation body and the rear end of the impeller, and a radially inner end of the joint is exposed to the cavity, that is formed between the end of the shaft and the rear end of the impeller.

10. The turbomachine of claim 9, wherein the extension portion is sealingly coupled with the rear end of the impeller by a sealing member.

11. The turbomachine of claim 10, wherein the extension portion is fitted with the rear end of the impeller by the sealing member.

12. The turbomachine of claim 10, wherein the sealing member is an O-ring.

13. The turbomachine of claim 9, wherein the extension portion extends from the rotation body in an axial direction of the rotation body.

14. The turbomachine of claim 9, wherein the rotation body integrally rotates together with the shaft.

15. The turbomachine of claim 9, wherein the rotation body has a thread formed on a surface of the rotation body, the surface being coupled with the shaft by a thread formed on the shaft that corresponds to the thread formed on the rotation body.

16. The turbomachine of claim 9, wherein the rotation body is sealingly coupled with the shaft by an adhesive.

17. The sealing assembly of claim 1, wherein the extension portion extends from the rotation body in axial and radial directions of the rotation body.

18. The turbomachine of claim 9, wherein the extension portion extends from the rotation body in axial and radial directions of the rotation body.

* * * * *